(12) United States Patent (10) Patent No.: US 7,797,251 B2
Smith (45) Date of Patent: Sep. 14, 2010

(54) SYSTEM AND METHOD PROVIDING SECURE CREDIT OR DEBIT TRANSACTIONS ACROSS UNSECURE NETWORKS

(75) Inventor: Steven W. Smith, Dallas, TX (US)

(73) Assignee: 5th Fleet, L.L.C., Richardson, TX (US)

( * ) Notice: Subject to any disclaimer, the term of this patent is extended or adjusted under 35 U.S.C. 154(b) by 281 days.

(21) Appl. No.: 11/706,001

(22) Filed: Feb. 13, 2007

(65) Prior Publication Data

US 2008/0195550 A1 Aug. 14, 2008

Related U.S. Application Data

(63) Continuation-in-part of application No. 11/607,764, filed on Dec. 1, 2006, now Pat. No. 7,502,936, which is a continuation-in-part of application No. 11/061,223, filed on Feb. 18, 2005, now Pat. No. 7,581,113, which is a continuation-in-part of application No. 09/783,049, filed on Feb. 14, 2001, now Pat. No. 7,043,640.

(51) Int. Cl.
*G06F 17/60* (2006.01)

(52) U.S. Cl. .............................. 705/72; 705/64; 726/1; 726/5; 726/21; 726/27; 713/183; 713/184

(58) Field of Classification Search ................. 705/1–79
See application file for complete search history.

(56) References Cited

U.S. PATENT DOCUMENTS

| | | | |
|---|---|---|---|
| 4,197,524 A | 4/1980 | Salem | |
| 4,455,588 A | 6/1984 | Mochida et al. | |
| 4,621,334 A | 11/1986 | Garcia | |
| 4,805,222 A | 2/1989 | Young et al. | |
| 5,241,594 A | 8/1993 | Kung | |
| 5,434,562 A | 7/1995 | Reardon | |
| 5,623,600 A | 4/1997 | Ji et al. | |

(Continued)

FOREIGN PATENT DOCUMENTS

EP 1544822 A1 * 6/2005

OTHER PUBLICATIONS

RSA Security, Authenticators, The Gold Standard in Two-Factor User Authentication, www.rsasecurity.com, Feb. 15, 2005. Retrieved from IDS June 15, 2010.*

(Continued)

*Primary Examiner*—James A Reagan
(74) *Attorney, Agent, or Firm*—Steven W. Smith

(57) ABSTRACT

A system and method for providing secure credit and debit transactions across unsecure data networks. The present invention provides a one-time-use combination of account number, PIN, and added factors. A merchant terminal receives a customer identifier such as a PIN from a customer and combines secret information with the PIN when the terminal sends the PIN to an authorization server. The secret information is stored in an indexed database protected by a mechanical switch, which must be physically closed to access the database. The database may be implemented in the merchant terminal or in a customer device in communication with the merchant terminal. The authorization server provides an index pointing to one or more secret factors to be combined with the PIN for each given transaction.

7 Claims, 9 Drawing Sheets

U.S. PATENT DOCUMENTS

| | | | |
|---|---|---|---|
| 5,832,208 A | 11/1998 | Chen et al. | |
| 5,842,002 A | 11/1998 | Schnurer et al. | |
| 5,960,170 A | 9/1999 | Chen et al. | |
| 6,401,210 B1 | 6/2002 | Templeton | |
| 6,931,552 B2 | 8/2005 | Pritchard et al. | |
| 7,043,640 B2* | 5/2006 | Pritchard et al. | 713/184 |
| 7,499,889 B2* | 3/2009 | Golan et al. | 705/50 |
| 2003/0007464 A1* | 1/2003 | Balani | 370/310 |
| 2004/0030601 A1* | 2/2004 | Pond et al. | 705/16 |
| 2004/0215963 A1* | 10/2004 | Kaplan | 713/172 |
| 2005/0149762 A1 | 7/2005 | Smith et al. | |
| 2005/0182720 A1* | 8/2005 | Willard et al. | 705/40 |
| 2006/0070125 A1 | 3/2006 | Pritchard et al. | |
| 2006/0136740 A1 | 6/2006 | Smith et al. | |
| 2006/0136993 A1 | 6/2006 | Smith | |
| 2007/0156576 A1* | 7/2007 | Imrey et al. | 705/38 |

OTHER PUBLICATIONS

Bradwell, David; *Security for Single PCs or Networks*; PC User; Sep. 7, 1994; p. 93.

RSA Security, *Authenticators, The Gold Standard in Two-Factor User Authentication*, www.rsasecurity.com, Feb. 15, 2005.

*Evolving Credit*, Popular Science, Feb. 2007, p. 47.

U.S. Appl. No. 11/607,764, Weatherford et al.

* cited by examiner

SYSTEM AND METHOD PROVIDING SECURE CREDIT OR DEBIT TRANSACTIONS ACROSS UNSECURE NETWORKS

This application is a continuation-in-part of U.S. patent application Ser. No. 11/607,764 filed Dec. 1, 2006, now U.S. Pat. No. 7,502,936 which is a continuation-in-part of U.S. patent application Ser. No. 11/061,223 filed Feb. 18, 2005, now U.S. Pat. No. 7,581,113 which is a continuation-in-part of U.S. patent application Ser. No. 09/783,049 filed Feb. 14, 2001, now U.S. Pat. No. 7,043,640, the entire disclosures of which are incorporated by reference herein.

BACKGROUND OF THE INVENTION

The present invention is directed, in general, to financial authorization systems. More particularly, and not by way of limitation, the present invention is directed to a system and method for providing secure credit or debit transactions across unsecure data networks.

Conventionally, financial transactions such as credit and debit transactions have been performed by swiping the magnetic stripe on a credit or debit card through a magnetic reader, which reads the account number encoded magnetically on the card and transmits the account number over the Internet to an authorization server. With the growth in the number and sophistication of hackers on the Internet, the conventional method has become extremely dangerous. A primary weakness in the conventional method is that the same account number is transmitted time after time. For credit transactions, this is all the information a hacker needs to perform fraudulent transactions.

One proposed prior art solution uses a credit card with an embedded microchip. The card still has a static account number, but during each transaction, the customer presses a small button on the card to activate the microchip. The microchip calculates a new string of additional electronic digits, which are displayed on the card and are added to the static digits of the account number. Thus, a dual-factor account number is created, which changes for each transaction. A hacker who tries to use the digits from a previous purchase will be unsuccessful because the previous dual-factor account number has expired. The customer may also be required to enter a Personal Identification Number (PIN) to guard against a thief using a stolen card.

This solution, however, fails to address several key threats present on the Internet today. For example, an active hacker may intercept and alter the data packet containing the dual-factor account number and PIN sent from the customer to the authentication server, preventing the original packet from arriving at the server. The active hacker may then alter the data contents of the packet or may alter address information, thereby posing as the authorized user. The above solution of adding a new string of additional electronic digits to the user's static account number does not defeat this type of active hacker. Even if the additional electronic digits have a short predetermined life span, the above solution does not defeat this type of active hacker if the hacker can access the server while the new string of additional electronic digits is still valid.

Also, merchant terminals are becoming more like computers. While this provides them with increased capabilities, it also provides opportunities for hackers to download virus programs such as key-logging (Trojan) programs that monitor and report all of the keystrokes on the keypad. Nothing in the prior art solution prevents a hacker from obtaining the customer's PIN with a key-logging program. Alternatively, if the hacker only intercepts the dual-factor account number, he can use a brute-force attack (trying hundreds or thousands of combinations per second) to guess the customer's PIN. PINs are normally only four digits, so they are not very difficult to defeat with a brute force attack. The hacker then has all the information he needs to perform a fraudulent transaction.

The customer may also use the prior art dual-factor credit card to purchase goods or services directly from Internet websites. In another type of active hacking, the hacker intercepts and alters the destination address of the client's data packet to a fake website which simulates the website the user was trying to reach. In an alternative form of this technique, known as phishing, the hacker sends an e-mail to the user posing as his credit card issuer's security department and asks the user to click on a link to verify his account information. The link takes the user to a fraudulent phishing site where the user is asked to enter his account number and his PIN. If the customer enters his dual-factor account number and his PIN, the hacker operating the fishing site then has all the information he needs to perform a fraudulent transaction. The prior art solution does not address this problem.

Currently, there is no known solution for countering all of the above hacker threats. Therefore, a need exists in the art for an improved system and method for providing secure credit and debit transactions, which overcomes the shortcomings of the prior art. The present invention provides such a system and method.

SUMMARY OF THE INVENTION

The present invention is directed to a system and method for providing secure credit and debit transactions across unsecure data networks. The present invention provides a one-time-use combination of account number, PIN, and added factors. Since the combination is good only one time, this defeats passive hackers who learn the combination and attempt to use it later. In addition, unlike the prior art, the present invention provides a solution that defeats active hackers, key-logging programs, phishing sites, and brute force attacks.

In one aspect, the present invention is directed to a computer-implemented method of securely sending a multi-digit personal identification number (PIN) from a merchant terminal to an authorization server. The method includes the steps of placing each digit of the PIN in a different one of a plurality of data packets; and sending each of the plurality of data packets on a different path from the merchant terminal to the authorization server.

In another aspect, the present invention is directed to a computer-implemented method of securely authenticating a customer's multi-digit PIN sent from a merchant terminal to an authorization server, wherein the merchant terminal sends each digit of the multi-digit PIN to the authorization server in a different one of a plurality of data packets. The method includes the steps of receiving the plurality of data packets from the merchant terminal; associating the plurality of data packets as related packets; extracting the digits of the PIN from the plurality of related password packets; and comparing the assembled multi-digit PIN with a stored PIN associated with the customer.

In another aspect, the present invention is directed to a computer-implemented method of securely authorizing a financial transaction between a merchant terminal and an authorization server. The method may begin with the merchant terminal reading an account number from a customer-held device and sending the account number to the authorization server. The authorization server uses the account number to retrieve an associated index value from a factor database; and sends the index value to the merchant terminal. The merchant terminal requests the customer to enter a multi-digit PIN and to close a security switch, which physically isolates a table of factors from the merchant terminal when the switch is open and enables access to the table when the switch is closed. The merchant terminal uses the index value to retrieve an associated factor from the table of factors, modifies the PIN with the retrieved factor, and sends the modified PIN to the authorization server. The authorization server authorizes the financial transaction only if the modified PIN matches a stored PIN as modified by a factor associated with the index retrieved from the factor database.

In another aspect, the present invention is directed to a system for securely sending a customer identifier from a merchant terminal to an authorization server. The system includes means for receiving the customer identifier from a customer; and means for combining secret information with the customer identifier when the merchant terminal sends the customer identifier to the authorization server. The means for combining secret information may include an indexed database populated with information to be combined with the customer identifier. The secret information may be retrieved from the database in accordance with an index value received by the merchant terminal from the authorization server. In one embodiment, the indexed database is implemented in the merchant terminal. In another embodiment, the indexed database is implemented in a customer device in communication with the merchant terminal.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF EMBODIMENTS

The present invention is directed to a system and method for providing secure credit and debit transactions across unsecure data networks. For simplification, the description herein refers to a "credit device". This term is understood to include both credit and debit devices within the scope of the present invention.

Figure 1:
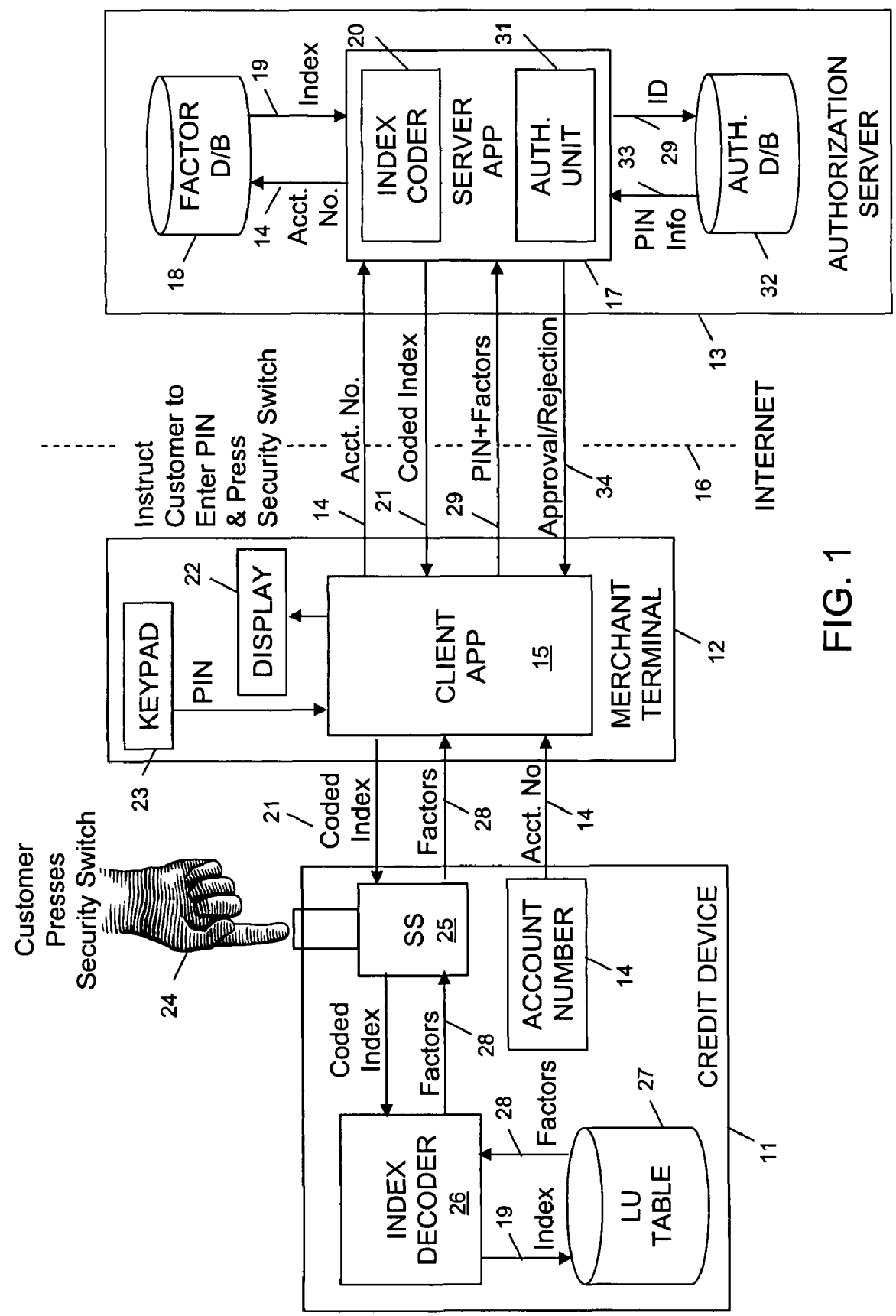
FIG. 1 is a simplified block diagram of a first exemplary embodiment of the system of the present invention.

FIG. 1 is a simplified block diagram of a first exemplary embodiment of the system of the present invention. The system may include a credit device 11, a merchant terminal 12, and an authorization server 13. The credit device may be in the form of a small plug-in device equipped, for example, with a Universal Serial Bus (USB) connector which connects to a USB port on the merchant terminal. The credit device may also be in the form of a smart card having an embedded microprocessor, memory device, security switch, and optionally, a radio frequency (RF) transceiver for communicating with the merchant terminal.

To conduct a credit transaction, a customer connects the credit device 11 to the merchant terminal 12 to transfer an account number 14 from the credit device to a client application 15 in the merchant terminal. Alternatively, the account number may be transferred through a magnetic, optical, RF, or other suitable input device. The client application forwards the account number over a data network such as the Internet 16 to a server application 17 in the authorization server 13. The server application sends the account number to a factor database 18. The factor database may include one or more lookup tables for storing factors utilized by various credit devices to modify Personal Identification Numbers (PINs) entered by customers during credit transactions. The factor database selects a set of factors for this particular customer for this particular credit transaction. The factor database then sends an index value 19 associated with the selected factors to the server application 17. An index coder 20 may then code the index and send a coded index 21 to the client application 15.

Coding the index value prevents a hacker from intercepting the account number and falsely posing as the server in order to obtain additional information from the customer. In addition, phishing sites are unable to return a valid index or a coded index. If the client application 15 does not receive a valid coded index, the secret factors cannot be retrieved from the lookup table 27, and the client application never transmits the modified PIN. Therefore, the present invention defeats phishing sites.

Upon receiving the coded index 21, the client application 15 presents an instruction to the customer through an appropriate interface device such as a visual display 22 and/or an audio speaker (not shown). The instruction requests the customer to enter a PIN into the merchant terminal 12 and then press a security switch (SS) 25 on the credit device 11. The customer may enter the PIN through a suitable input device such as a keypad 23. At 24, the customer presses (closes) the security switch on the credit device. The security switch is a mechanical switch which, when open, physically isolates program code in an index decoder 26 and data in a lookup table 27.

Once the customer presses the security switch 25, the client application 15 sends the coded index 21 through the security switch to the index decoder 26. The index decoder decodes the coded index to reproduce the index value 19. The index value 19 is then used to access the lookup table 27 to retrieve secret factors 28 for modifying and protecting the customer's PIN. The retrieved factors are passed through the security switch to the client application 15. Firmware in the security switch automatically opens the switch following the download of one set of factors. Opening the security switch physically isolates the index decoder and the lookup table from any hostile software programs that may have been loaded onto the merchant terminal by hackers.

The client application 15 then modifies the entered PIN and sends the modified PIN (PIN+factors) 29 to the server application 17. An authorization unit 31 accesses an authorization database 32 utilizing an identifier such as the account number, PIN, or modified PIN to retrieve stored PIN information 33. The authorization unit compares the PIN received from the client application with the PIN retrieved from the authorization database. The authorization unit also compares the modifications made to the PIN with the factors previously retrieved from the factor database 18. The authorization unit approves the modified PIN only if the PIN received from the client application matches the PIN retrieved from the authorization database, and the modifications made to the PIN match the factors retrieved from the factor database. If approved, an approval 34 is returned to the client application. However, if the retrieved information does not match the modified PIN, a rejection is returned to the client application.

It should be noted that if a key logging (Trojan) program has been downloaded to the merchant terminal 12, such a program may capture the digits of the PIN entered by the customer through the keypad 23. However, the secret factors 28, which are used to modify the entered PIN, are not typed in through the keypad and thus are not learned by the Trojan program. Therefore, the present invention defeats key logging (Trojan) programs.

In one embodiment, the secret factors 28 comprise a second, secret server address, which is used by the client application 15 to send the customer's PIN to a secret server address unknown to hackers. An active hacker may be capable of monitoring a router for packets addressed to a known destination address, and rerouting those packets to a new destination. With this embodiment, the customer's PIN is sent to a secret address, and the active hacker is defeated.

In another embodiment, the secret factors 28 comprise a plurality of secret server addresses. The client application 15 sends each digit in the PIN in a separate data packet, and addresses each data packet to a different server address. If a hacker is monitoring a particular router in the Internet, looking for a particular server address, the hacker will not be able to intercept the entire PIN. The plurality of server addresses may be associated with the same server, or may be associated with different servers connected through a secure network. Sending each digit of the PIN to widely dispersed servers insures that the packets followed different paths through the Internet. Therefore an active hacker monitoring a particular router has almost no chance of intercepting the entire PIN.

The present invention defeats phishing sites because the fraudulent phishing site cannot return a properly coded index value 21 in response to receiving the account number 14 from the client application 15.

In another embodiment, the secret factors 28 comprise a series of time delay intervals to be placed between individual packets by the client application 15. Once again, the client application sends each digit in the PIN in a separate data packet. Following the transmission of the first data packet, the client application waits a predefined time period before transmitting the second data packet. Following the transmission of the second data packet, the client application waits a predefined time period before transmitting the third data packet, and so on. The predefined time delay intervals may vary from 0 ms to any maximum value desired. For practical purposes, a maximum time delay interval should be selected so that the transmission of the entire PIN does not become burdensome to the customer. For example, if the maximum time delay interval is one second, it will take approximately three seconds to transmit a four-digit PIN.

In this embodiment, the server application 17 measures the time of receipt of each packet and computes the time delay intervals. The PIN is authenticated only if the digits are correct and the time delay intervals are also correct. A benefit of this embodiment is that it defeats brute force attacks. In a brute force attack, a hacker may send hundreds or thousands of guesses to the server application each second in an attempt to guess the customer's PIN. By physically delaying the time required to receive a PIN (and therefore the time required to make a guess), brute force attacks are defeated.

It should be noted that extensive testing has shown that the Internet 16 is stable enough to deliver packets at the server application 17 with very nearly the same time spacing with which they were transmitted by the client application 15. A small tolerance of approximately +/−20 ms may be required to reduce false rejections. Additionally, if a PIN is rejected because of a timing variance, but the digits of the PIN are correct, the server may automatically request the client application to retransmit the PIN. In almost all cases where a PIN is rejected due to a timing variance, a retransmission is successfully authenticated.

In another embodiment, the factors may be additional characters/digits added to the PIN. The additional characters/digits may be added to the beginning of the PIN, the end of the PIN, or may be interleaved between the digits of the PIN. The authorization server knows what additional characters/digits are being added and the placement of the additional characters/digits in relation to the digits of the PIN. Therefore all of these factors may be authenticated by the authorization server in addition to the PIN digits. Other suitable factors, which add cryptologic complexity to the PIN may also be utilized within the scope of the present invention.

The process performed by the present invention provides all the benefits of the prior art dual-factor credit card, plus more. The present invention provides a one-time-use combination of account number, PIN, and added factors. Since the combination is good only one time, this defeats passive hackers who learn the combination and attempt to use it later. In addition, unlike the prior art, the present invention provides a solution that defeats active hackers, key-logging programs, phishing sites, and brute force attacks.

Figure 2:
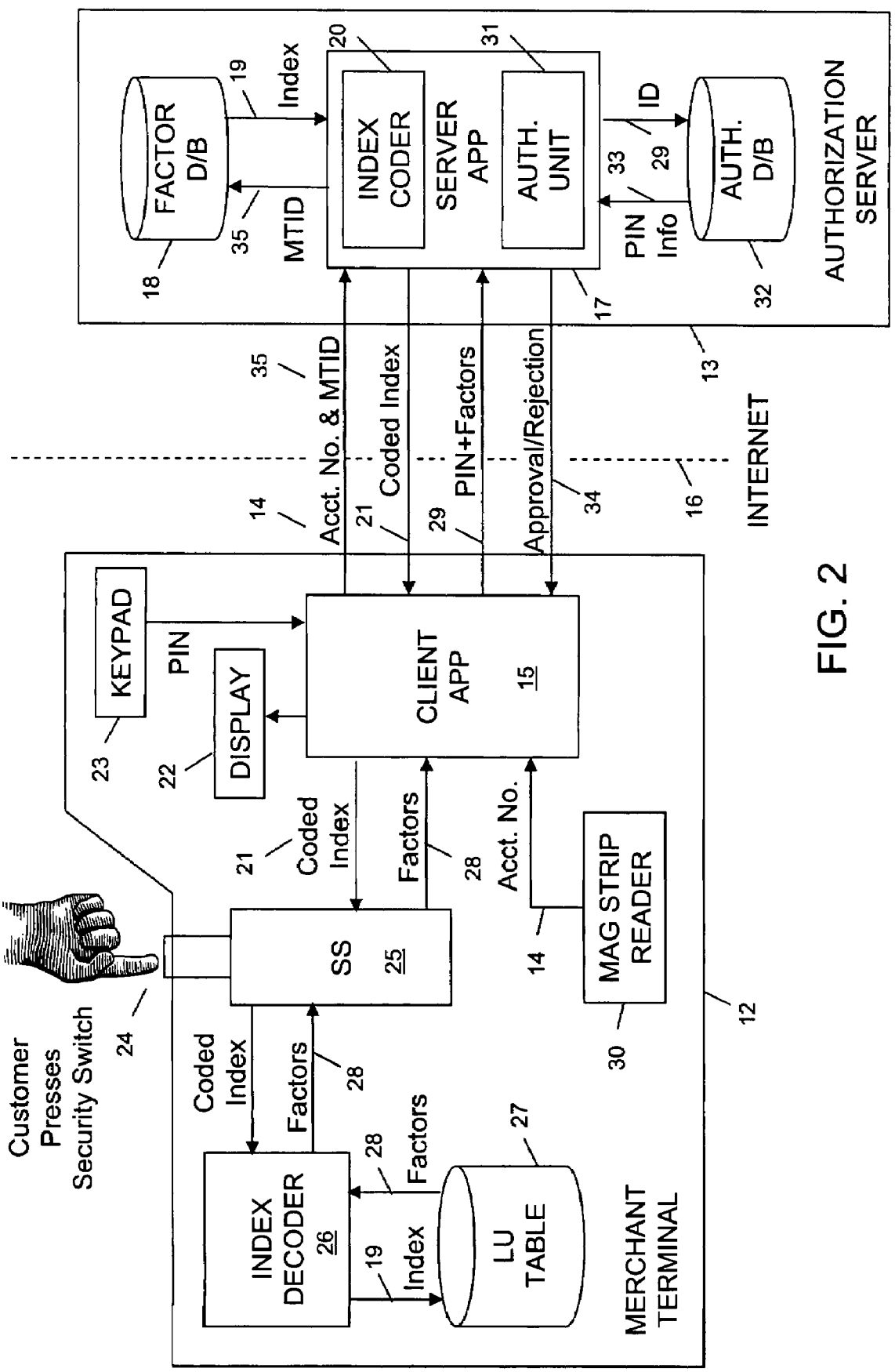
FIG. 2 is a simplified block diagram of a second exemplary embodiment of the system of the present invention.

FIG. 2 is a simplified block diagram of a second exemplary embodiment of the system of the present invention. In this embodiment, security features of the present invention are implemented within the merchant terminal 12. Thus, the merchant terminal includes the security switch 25, the index decoder 26, and the lookup table 27. The merchant terminal may also include a magnetic strip reader 30 to read the customer's account number from a credit or debit card. In this embodiment, the lookup table stores secret factors associated with the merchant terminal 12 rather than each particular customer. The factor database 18 in the authorization server 13 stores a table corresponding to each merchant terminal authorized to interact with the authorization server.

When a customer swipes his credit or debit card through the magnetic strip reader 30, the client application 15 sends the account number 14 and a merchant terminal identifier (MTID) 35 to the authorization server 13. The authorization server performs an initial check to determine whether the account number is valid, and uses the MTID to determine the coded index 21 for a set of factors to be utilized for this transaction. The coded index is returned to the client application in the merchant terminal 12, which then instructs the customer to enter his PIN through the keypad 23 and to press the security switch 25. The security switch may be set up simply as an Enter button, which the customer presses after entering his PIN. This is a familiar action to the customer, and it reduces the perceived complexity of the transaction.

When the customer presses the security switch at 24, the switch is momentarily closed, allowing the client application 15 to make a single access to the lookup table 27. The index decoder 26 decodes the index and retrieves the secret factors 28. Once the factors are passed through the security switch to the client application, firmware causes the security switch to open, thereby physically isolating the lookup table from potential hacker programs. The client application then modifies the customer's PIN using the secret factors, and sends the modified PIN to the authorization server for final approval or rejection.

As in the first embodiment, the secret factors in this embodiment may take many forms. The factors may be additional characters/digits added to the PIN, multiple IP addresses for sending each digit of the pin to a different address, inter-packet time-delay intervals for individually transmitting each digit of the PIN, or any other suitable factor adding cryptologic complexity to the PIN. The secret factors are for one-time use only. Therefore, a uniquely modified PIN is automatically generated and transmitted for each transaction. The process is transparent to the customer, who continues to enter the same PIN for every transaction.

Figure 3:
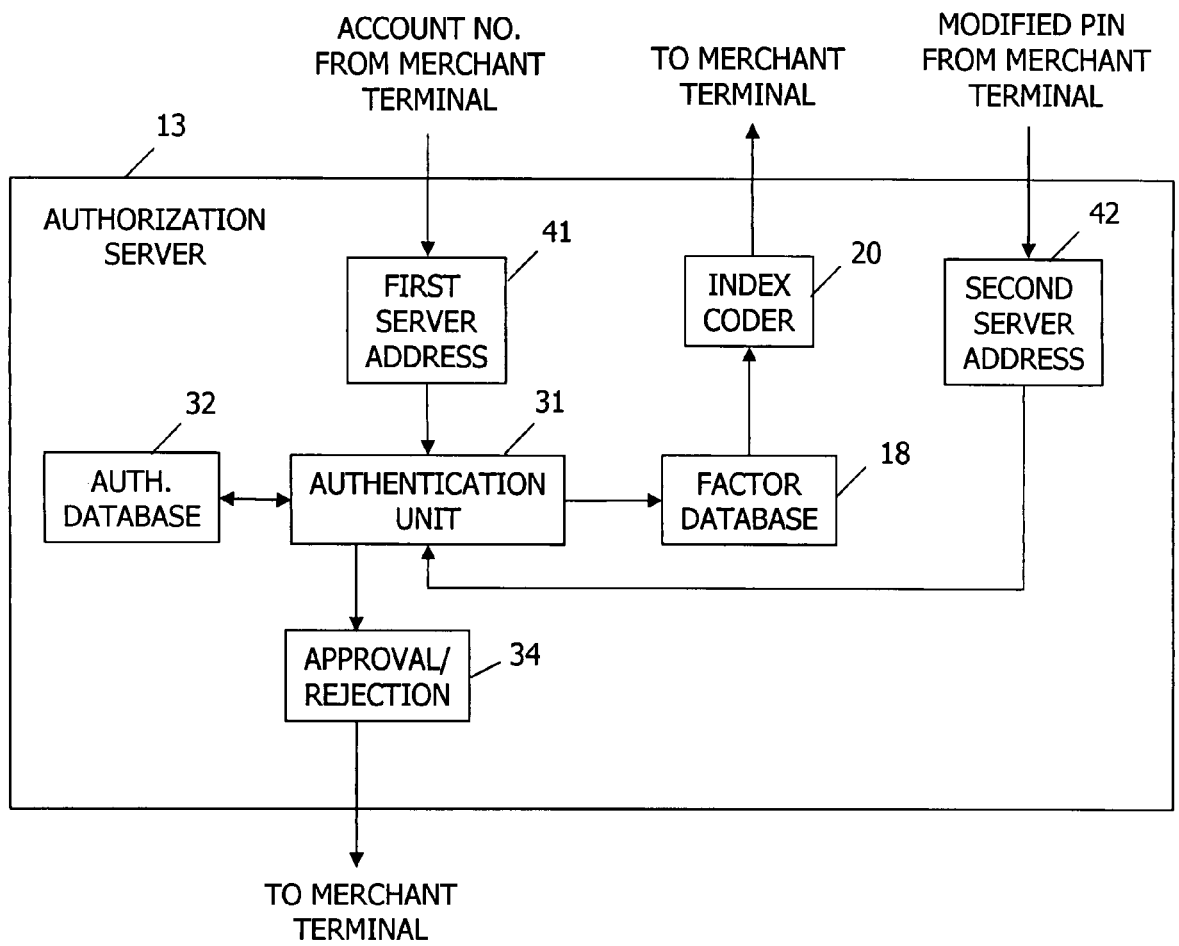
FIG. 3 is a simplified block diagram of an authorization server in an exemplary embodiment of the present invention.

FIG. 3 is a simplified block diagram of an authorization server 13 in an exemplary embodiment of the present invention. In this embodiment, the lookup table 27 in the credit device 11 stores a plurality of secret server addresses. The server receives the account number from the merchant terminal 12 at a first server address 41. The authentication unit 31 retrieves the index from the factor database 18, and the index coder 20 sends the coded index to the merchant terminal. Later, after the customer has pressed a security switch and entered his PIN, the credit device uses the index value to retrieve a second server address from the lookup table 27. The credit device sends the second server address to the merchant terminal. The merchant terminal then sends the PIN to the authorization server utilizing the second server address 42. Any hacker monitoring the first server address will not detect the PIN sent to the second server address.

Figure 4:
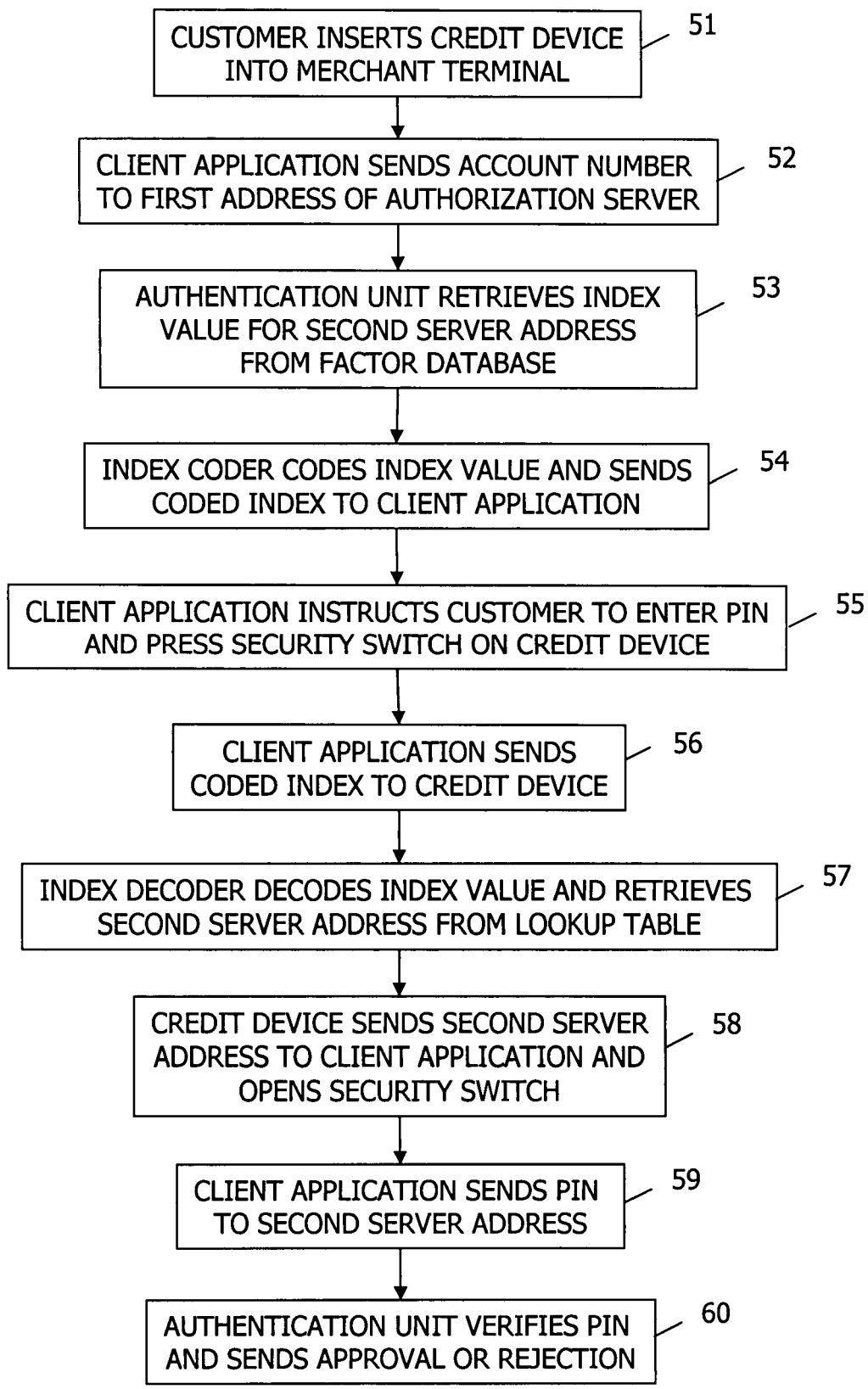
FIG. 4 is a high-level flow diagram illustrating the steps of an exemplary embodiment of a method of authenticating a PIN performed by the server of FIG. 3.

FIG. 4 is a high-level flow diagram illustrating the steps of an exemplary embodiment of a method of authenticating a PIN performed by the server of FIG. 3. At step 51, the customer inserts the credit device 11 into the merchant terminal 12. At step 52, the client application 15 sends the account number 14 to the first server address 41 of the authorization server 13. At step 53, the authentication unit 31 retrieves the index value for the second server address 42 from the factor database 18. At step 54, the index coder 20 codes the index value and sends the coded index 21 to the client application.

Upon receiving the coded index 21, the client application 15 instructs the customer to enter his PIN and to press the security switch 25 on the credit device 11 at step 55. At step 56 the client application sends the coded index to the credit device. At step 57 the index the coder 26 decodes the index value and retrieves the second server address 42 from the lookup table 27. At step 58, the credit device sends the second server address to the client application and opens the security switch. At step 59, the client application sends the PIN to the second server address 42. At step 60, the authentication unit verifies the PIN and sends an approval or rejection 34 as required.

Figure 5:
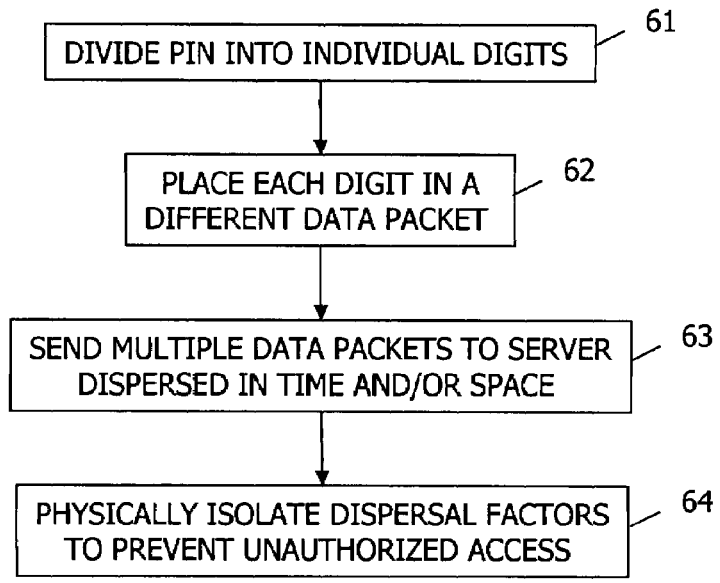
FIG. 5 is a high-level flow diagram illustrating the steps of an exemplary embodiment of the method of the present invention.

FIG. 5 is a high-level flow diagram illustrating the steps of an exemplary embodiment of the method of the present invention. At step 61, the PIN is divided into individual digits. At step 62, each digit is placed in a different data packet. At step 63, the multiple data packets are sent to the server dispersed in time and/or space. At step 64, the dispersal factors utilized to disperse the packets in time and/or space are physically isolated to prevent unauthorized access.

Figure 6:
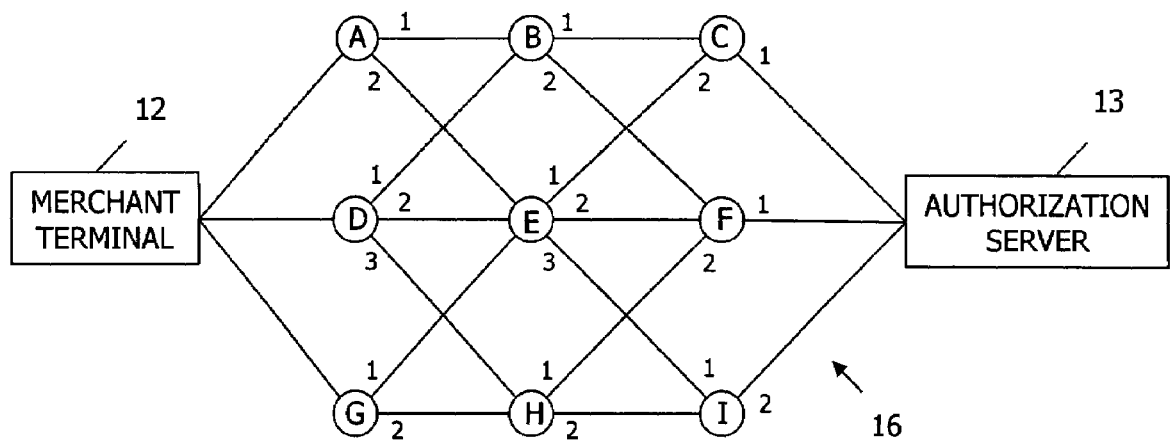
FIG. 6 illustrates a data network topology in which forced packet routing is implemented.

FIG. 6 illustrates a data network topology in which forced packet routing is implemented. In one embodiment, routers in the network are modified with a dynamic routing table. When a packet is received with a predefined destination address associated with, for example a financial institution, the router is programmed to send the packet out on a designated port. For example, the merchant terminal 12 may send PIN packets over the Internet 16 to the authorization server 13 located at a bank. Router-A may be programmed to send packets with the bank's destination address on port 1 to Router-B. Likewise, Router-B may be programmed to send packets with the bank's destination address on port 1 to Router-C. At some later time, the routing table may be modified so that Router-A sends packets with the same destination address on port 2 to Router-E, which is programmed to send the packets through either port 1, 2, or 3 to Router-C, Router-F, or Router-I, respectively. Thus, rather than letting the routers choose the shortest path or lightest loaded path, which may almost always be the same, the routers are forced to vary the path according to their dynamic routing tables.

In one embodiment of the present invention, the merchant terminal 12 divides the PIN into multiple segments and sends each segment in a different packet to a different router. The first packet may be sent to Router-A, the second packet to Router-D, and the third packet to Router-G, for example. Each packet includes the bank's address as its destination address. Each router uses its dynamic routing table to further route the packet it receives. If a hacker is monitoring a router such as Router-D because it is on the shortest path to the server 1302, the hacker will only see the second packet and will not learn all of the digits of the PIN.

In another embodiment of the present invention, the authorization server 13 has multiple IP addresses which are known to the merchant terminal 12. The merchant terminal divides the PIN into multiple segments and sends each segment in a different packet. Each packet is addressed to a different IP address of the server. The routers in this embodiment may be configured with static routing tables. When a packet is received with a predefined destination address, the router is programmed to send the packet out on a designated port. The password packets follow different routes to the server because the routing tables route packets addressed to the different IP addresses through different ports of each router. Thus, packet routing is changed by changing the destination address. Once again, if a hacker is monitoring a router such as Router-D because it is on the shortest path to the server, the hacker will not learn all of the digits of the PIN.

It should also be understood that the forced packet routing of the present invention may be performed through nodes other than routers. For example, if a large corporation or financial institution has many offices and many servers distributed around the country, the routing tables may be implemented in the company's servers and the PIN packets may be routed through intermediate company servers before arriving at the authentication server. The intermediate servers may perform the functions described above for routers. In this manner, forced packet routing may be achieved even though the company has no control over routers, for example, in the Internet.

Figure 7:
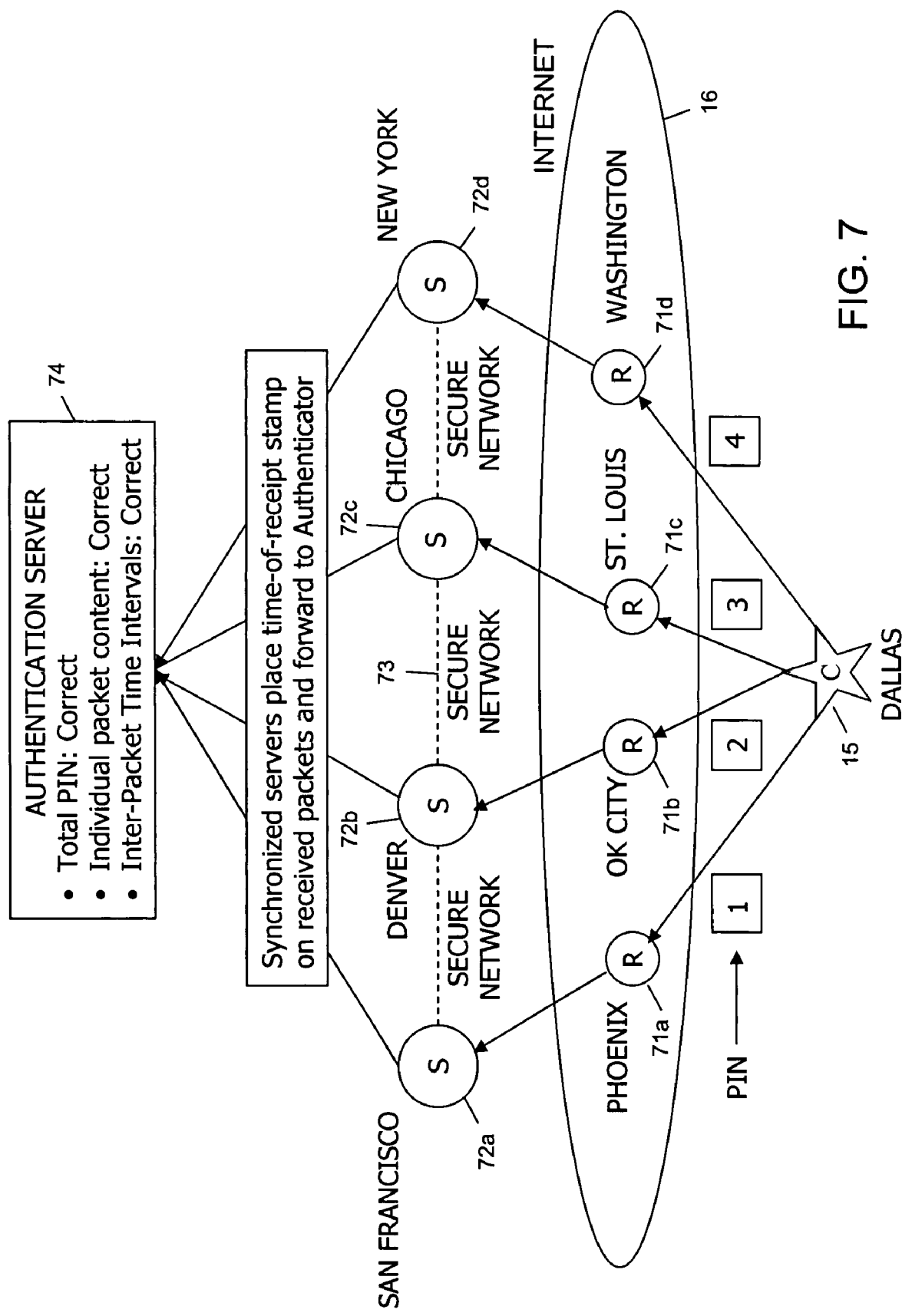
FIG. 7 illustrates a data network topology in which each digit of a PIN is routed to a different server prior to authentication.

FIG. 7 illustrates a data network topology in which each digit of a PIN is routed through the Internet 16 to a different bank server prior to authentication. In this example, the client application 15 in a merchant terminal in Dallas divides the PIN into multiple segments and sends each segment to the authentication server 74 in a different packet. Each packet is routed on a different path through the Internet, and thus passes through different routers 71a-71d. Each packet is sent to a different intermediate server 72a-72d. For example, a first packet carrying the first digit of the PIN may be sent to an intermediate server 71a in San Francisco, while a second packet carrying the second digit of the PIN is sent to an intermediate server 72b in Denver. A third packet carrying the third digit of the PIN may be sent to an intermediate server 72c in Chicago, while a fourth packet carrying the fourth digit of the PIN is sent to an intermediate server 72d in New York. Each of the intermediate servers may forward its received packet to another intermediate server or may send the packet directly to the authentication server 74. Once again, a hacker attempting to capture the password from a router located between Dallas and Chicago will not be able to capture all of the password characters.

Each of the intermediate servers 72a-72d may be connected over a secure network 73 to each other and to the authentication server 74. If the intermediate servers are synchronized, they can each measure the time-of-receipt of each packet and forward that timing information to the authentication server. The authentication server then positively authenticates the PIN only if the total PIN is correct, the individual packet content is correct, and the inter-packet time intervals are correct.

Figure 8:
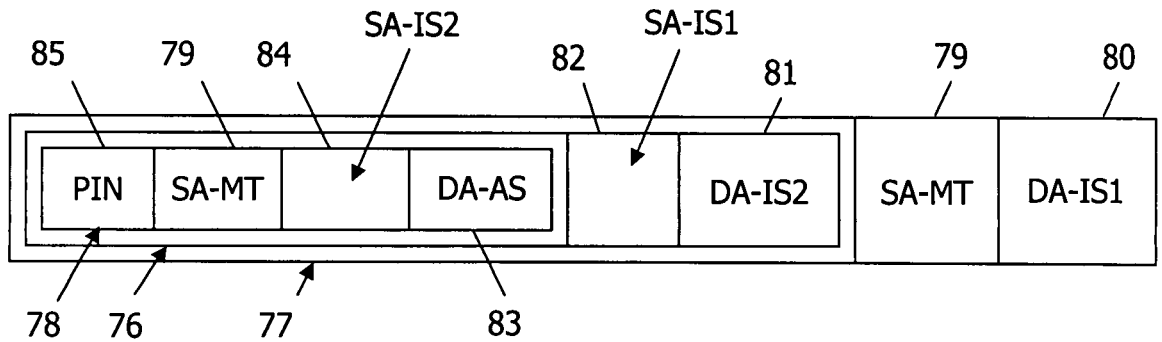
FIG. 8 illustrates a packet encapsulation method of implementing forced packet routing.

FIG. 8 illustrates a packet encapsulation method of implementing forced packet routing. In this embodiment, the merchant terminal 12 again divides the PIN into multiple segments and sends each segment to the authorization server 74 in a different packet. The packets are sent through intermediate servers or routers. In the example shown, a packet is sent through two intermediate servers, IS1 and IS2. The client application 15 in the merchant terminal sends an inner encapsulation frame 76 within an outer encapsulation frame 77. The inner encapsulation frame contains a PIN packet 78 and a header for the second intermediate server. The outer encapsulation frame includes its own header comprising the source address for the merchant terminal (SA-MT) 79 and the destination address for the first intermediate server (DA-IS1) 80.

When the first intermediate server receives the outer encapsulation frame, the server strips off the header, revealing the destination address for the second intermediate server (DA-IS2) 81 in the header for the inner encapsulation frame 76. The first intermediate server adds its own source address (SA-ISI) 82 to the header for the inner encapsulation frame and sends the frame to the second intermediate server. When the second intermediate server receives the inner encapsulation frame, the server strips off the header, revealing the destination address for the authorization server (DA-AS) 83 in the header for the PIN packet 78. The second intermediate server adds its own source address (SA-IS2) 84 to the header for the PIN packet and sends the packet to the authentication server. When the authentication server receives the packet, the server strips off the header, revealing the source address (SA-MT) 79 (or other identifier) of the merchant terminal 12 and one or more of the PIN digits (PIN) 85.

By encapsulating each of the PIN digits with the addresses of different intermediate servers or routers, the merchant terminal 12 can control the path which each packet follows to the authorization server 74. Once again, if the packets follow different paths, a hacker monitoring a single router or path will not obtain all of the password characters. Also, when the inventive time delays of the present invention are used as a second or third password factor, it is not possible for the hacker to determine the inter-packet timing.

Figure 9:
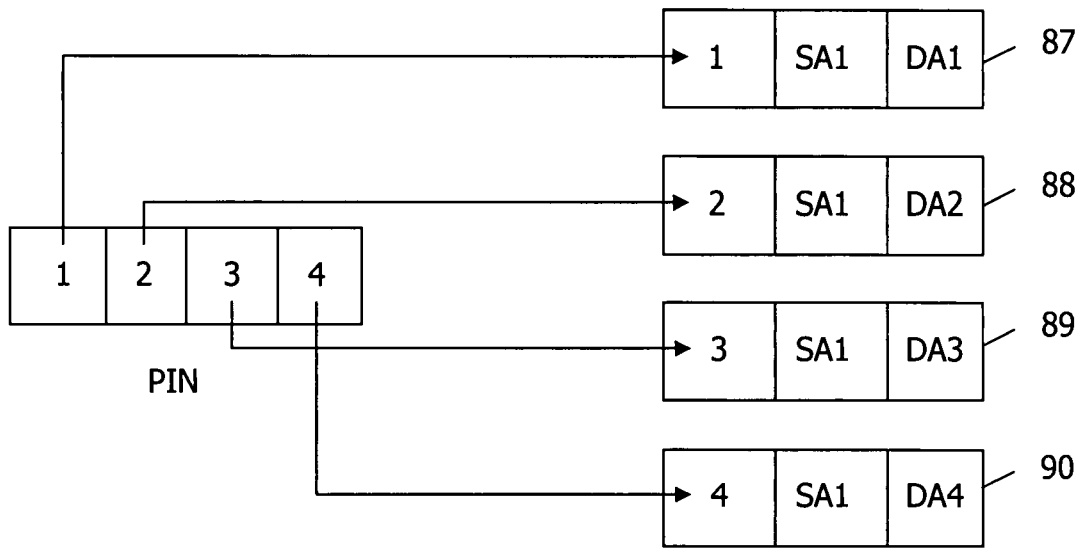
FIG. 9 illustrates an exemplary embodiment of a multi-digit PIN divided into segments and placed into different data packets in accordance with another embodiment of the present invention.

FIG. 9 illustrates an exemplary embodiment of a multi-digit PIN divided into segments and placed into different data packets in accordance with another embodiment of the present invention. In this embodiment, multiple IP addresses are assigned to the server, and are known only to authorized merchant terminals. The merchant terminal divides the PIN into multiple segments and places each segment in a different packet 87-90. The header of each packet includes an identifier such as a source address (SA1) that identifies the merchant terminal. Each packet header also includes a different one of the multiple IP addresses of the server as a destination address (DA1-DA4). The access device then sends the packets individually to the server. In one embodiment, the access device delays transmission of successive packets by predefined time periods known only to the access device and the server. Any hacker who has learned one of the server's IP addresses, and is monitoring that address to intercept PINs, will see only one portion of the customer's PIN.

Figure 10:
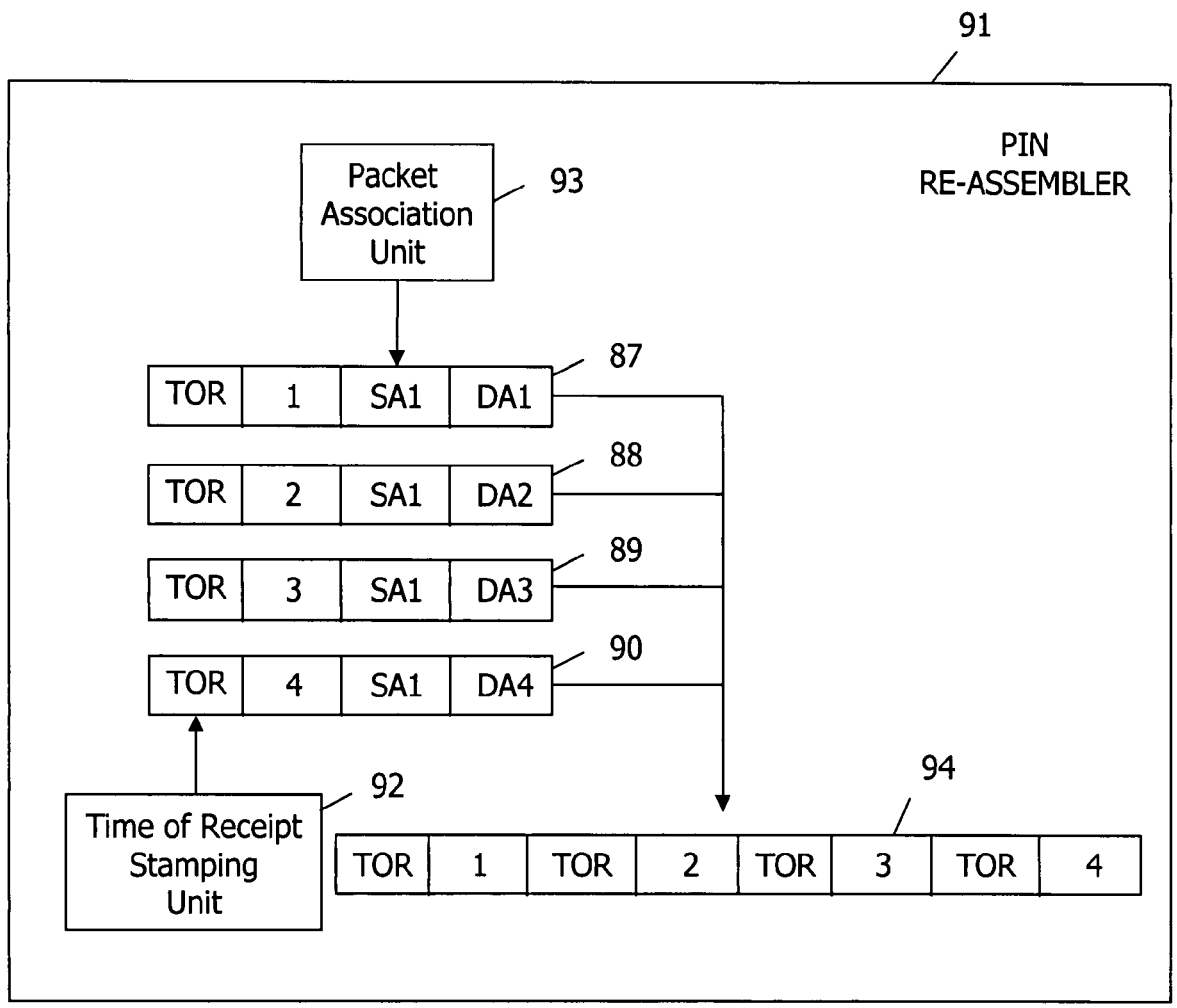
FIG. 10 is a simplified functional block diagram of an exemplary PIN re-assembler in an authentication server suitable for reassembling the multi-digit PIN of FIG. 9.
Figure 11:
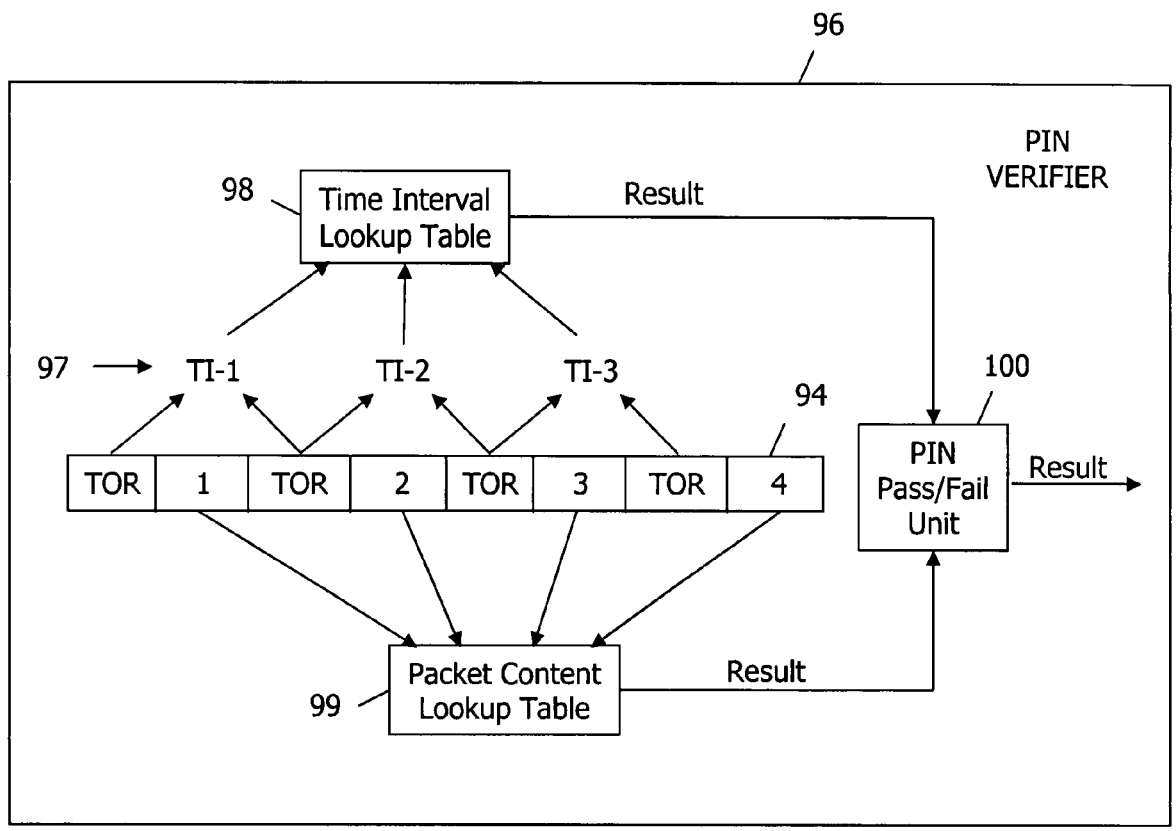
FIG. 11 is a simplified functional block diagram of an exemplary PIN verifier in an authentication server suitable for verifying the reassembled multi-digit PIN shown in FIG. 10.

FIG. 10 is a simplified functional block diagram of an exemplary PIN re-assembler 91 in an authorization server suitable for reassembling the PIN of FIG. 9. Upon receiving each packet at the server, a time-of-receipt stamping unit 92 places a time-of-receipt stamp on each incoming packet 87-90. A packet association unit 93 may use the identifier of the merchant terminal or other identifier to associate the different packets which comprise the PIN. The data portions of the associated packets are then combined into a reassembled PIN 94 and sent to a PIN verifier 96 (FIG. 11). If time delays are also being utilized as a second or third factor of the PIN, the time-of-receipt stamps are also sent to the PIN verifier.

FIG. 11 is a simplified functional block diagram of an exemplary PIN verifier 96 in an authorization server suitable for verifying the reassembled PIN 94 of FIG. 10. If time delays are being utilized as a second or third factor of the PIN, the verifier calculates the difference between each succeeding time-of-receipt stamp to determine time intervals 97, labeled as TI-1 through TI-3 in FIG. 11. A time interval lookup table 98 determines whether the calculated time intervals match stored time intervals associated with the merchant terminal. A tolerance factor may be applied to account for small variances in the time intervals due to timing delays in the data network between the merchant terminal and the server. The result is sent to a PIN pass/fail unit 100. Likewise, a packet content lookup table 99 determines whether the data portions of the reassembled PIN match stored packet content information associated with the account number received from the merchant terminal. The result is sent to the PIN pass/fail unit. The PIN pass/fail unit verifies the PIN only if the digits of the PIN are correct, the packet content of each packet is correct, and the time intervals between packets are correct, within any predefined tolerance values.

While the present invention has been described in the context of a fully functional computer system, and an exemplary financial authorization network, those skilled in the art will appreciate that the instructions for practicing the method of the present invention are capable of being recorded on any type of a computer readable medium. The steps of the method of the present invention are executed, regardless of the particular type of signal-bearing media actually utilized. Examples of computer readable media include: nonvolatile, hard-coded type media such as read only memories (ROMs) or erasable, electrically programmable read only memories (EEPROMs), recordable type media such as floppy disks, hard disk drives, solid state drives, flash memory and CD-ROMs, and transmission type media such as digital and analog communication links.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A computer-implemented method of securely authorizing a financial transaction between a merchant terminal and an authorization server, said method comprising:
   in the merchant terminal:
      reading an account number from a customer-held device; and
      sending the account number to the authorization server;
   in the authorization server:
      using the account number to retrieve an associated index value from a factor database; and
      sending the index value to the merchant terminal;
   in the merchant terminal:
      requesting the customer to enter a multi-digit personal identification number (PIN) and to close a security switch, said security switch physically isolating a table of factors from the merchant terminal when the switch is open and enabling access to the table when the switch is closed;
      using the index value to retrieve an associated factor from the table of factors;
      modifying the PIN with the factor retrieved from the table of factors; and
      sending the modified PIN to the authorization server; and
   in the authorization server:
      authorizing the financial transaction only if the modified PIN matches a stored PIN as modified by a factor associated with the index retrieved from the factor database.

2. A system for securely sending a customer identifier from a merchant terminal to an authorization server, said system comprising:
   in the merchant terminal:
      means for reading an account number from a customer-held device; and
      means for sending the account number to the authorization server;
   in the authorization server:
      a factor database for storing an index value associated with the account number; and
      a server application for retrieving the index value from the factor database and sending the index value to the merchant terminal;
   in the merchant terminal:
      a table of factors for storing a factor associated with the index value;
      a security switch that physically isolates the table of factors from the merchant terminal when the switch is open and enables access to the table when the switch is closed;
      a display for requesting the customer to enter a multi-digit personal identification number (PIN) and to close the security switch;
      a client application for retrieving the factor from the table of factors, modifying the PIN with the factor, and sending the modified PIN to the authorization server; and
   in the authorization server:
      an authentication unit that authorizes the financial transaction only if the modified PIN received from the client application matches a stored PIN as modified by the factor retrieved from the factor database.

3. The system according to claim 2, wherein the client application individually transmits each digit of the multi-digit PIN in a different data packet, wherein the factor is selected from a group consisting of:
   a plurality of server addresses assigned to the authorization server, wherein each of the data packets is sent to a different server address;
   additional digits or characters to be combined with each digit of the identifier in the data packets, wherein the server authenticates the digit of the identifier and the additional digits or characters in each data packet; and
   inter-packet time-delay intervals for separating each of the data packets from adjacent packets, wherein the server measures the time-delay intervals, between the data packets upon arrival and authenticates both the packet contents and the time-delay intervals.

4. The system according to claim 3, wherein the client application forces each of the plurality of data packets to follow a different path through the data network.

5. The system according to claim 4, wherein the data network includes a plurality of intermediate nodes through which the plurality of paths pass, each of said nodes having a plurality of output ports, and the system further comprises:
   a routing table in each node associating a destination address of the authorization server with an output port; and
   logic for determining that a packet received in the intermediate node includes the destination address of the authorization server, and in response thereto, for transmitting the packet through the output port indicated by the routing table.

6. The system according to claim 4, wherein the data network includes a plurality of intermediate nodes through which the plurality of paths pass, and the system further comprises:
   an encapsulation frame for encapsulating each data packet and the addresses of any intermediate nodes in the desired path for the packet; and
   a router within each intermediate node for stripping off a header of the encapsulation frame, for reading the next destination address contained within the frame, and for transmitting the packet to the next destination address until the packet arrives at the authorization server.

7. The system according to claim 2, wherein the client application individually transmits each digit of the multi-digit PIN in a different data packet, and the factor retrieved from the factor database includes inter-packet time-delay intervals for separating each of the data packets from adjacent packets;
   wherein the authorization server measures the time-delay intervals between the data packets upon arrival and the authentication unit authorizes the financial transaction only if the packet contents match a stored PIN for the customer, and the measured time-delay intervals match the inter-packet time-delay intervals of the factor retrieved from the factor database.

* * * * *